Jan. 26, 1965   R. B. PICKETT ETAL   3,166,977
STABILIZED WATER-LAUNCHED ROCKET VEHICLE
Filed Dec. 30, 1960
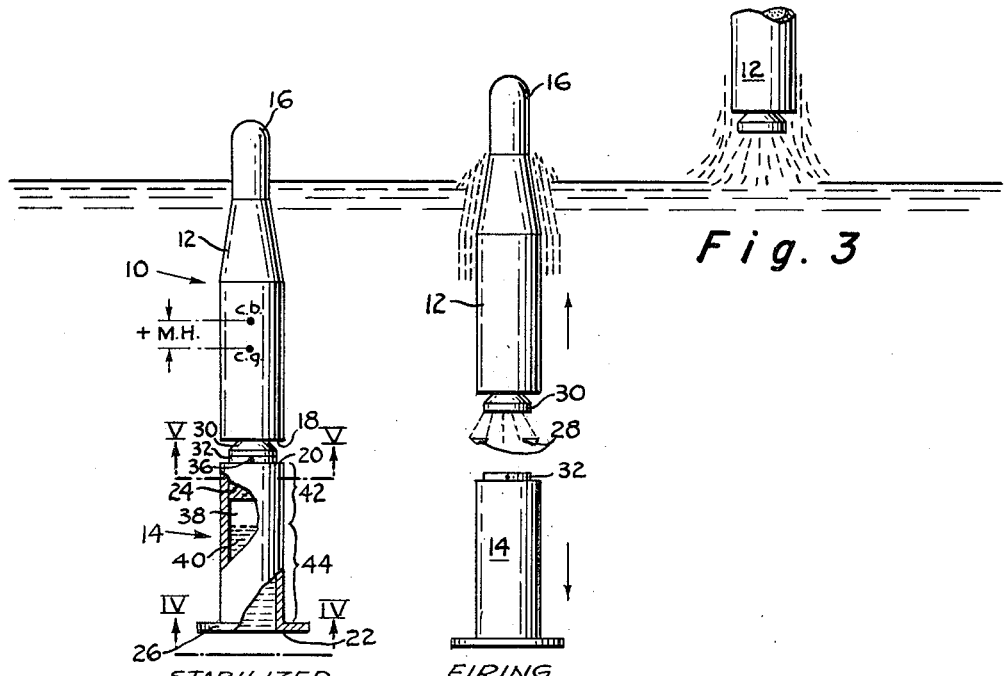
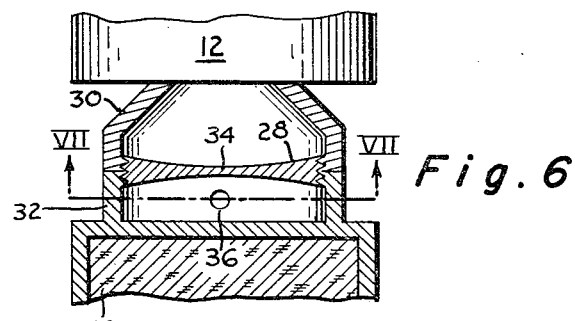
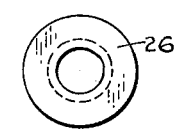
Fig. 4
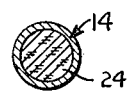
Fig. 5
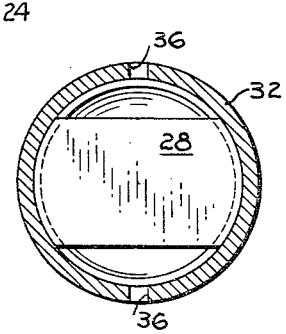
INVENTORS
ROBERT B. PICKETT
JOHN EMERY DRAIM
BY
*George J. Rubens*
ATTORNEY

United States Patent Office 3,166,978
Patented Jan. 26, 1965

3,166,978
STOWAGE ADAPTER
Wilson T. Price, San Jose, and Shiro Aisawa, Sunnyvale, Calif., assignors, by mesne assignments, to the United States of America as represented by the Secretary of the Navy
Filed Apr. 20, 1962, Ser. No. 189,215
2 Claims. (Cl. 89—1.7)

The instant invention relates generally to missile launchers and more specifically to stowage adapters and method therefor for isolating a missile from various environmental conditions.

With the advent of ballistic missiles came the need for a method and means of making the missile launching complex invulnerable to surprise attack by enemy missiles and aircraft. Without such invulnerability it would be possible for a ballistic missile capability to be completely destroyed before its missile could be launched in a retaliatory action. Further, without means to protect these launching complexes from destruction by enemy attack, they would be unable to fulfill their primary role as a deterrent to a possible enemy surprise attack. Accordingly, several expedients have been the subject of extensive research and development. The three most prominent methods are firstly, the hardening of launching sites, for example, building concrete silos below ground level; secondly, by launching the missile from an airborne aircraft; and thirdly by launching the missile from a moving ship or land vehicle. While this invention finds its primary use in missile launchers of the third category, it may be employed also in the missile launchers of the other two categories. That is, it is possible that the storage adapters encompassed by this invention may be utilized in conjunction with the isolation of any ballistic or guided missile from shock and vibration.

The missile launching systems which are mounted on vehicles usually are provided with a supply of missiles stored in a position which permits rapid firing. While certain vehicle induced vibrations and irregular shocks are sustained at the various speeds of the vehicle it should be understood that the missile itself as well as its guidance system and many of its other components should not be subjected to any substantial vibration or shock without occasioning hazardous adverse effects. Such shocks and vibrations are required to be isolated from the missile. The various vibrations occasioned at the various vehicle speeds become a limiting factor in the performance of a vehicle launched missile system. Since these vibrations are primarily generated by vehicle movement, the speed of the vehicle must necessarily be restricted to that necessary to prevent vibration damage to the missile and its components. Obviously, the restriction of speed upon the vehicle will greatly enhance its vulnerability. For the purpose of mitigating shock and vibration liquid springs have been employed between the vehicle and a launch tube. Additionally, non-linear ring type springs, normally termed stowage adapters, have been employed in the annular space between the missile and the launch tube. The use of liquid springs, however, causes certain undesirable conditions. That is, such springs are preloaded to such an extent that they normally act as rigid connections. Consequently, vehicle induced vibrations are not attenuated by the liquid springs, but to the contrary, are amplified as a path through the missile launcher's structure to the missile itself. Consequently, for satisfactory operation the stowage adapters between the launch tube and the missile are required to damp these vibrations.

The ring type springs which have been employed in sets of identical springs also, however, have certain disadvantages. It has been determined that, under certain circumstances, a tolerance-induced axial bow in the missile will produce prohibitive stresses in the missile. That is, the tolerance-induced axial bow causes a non-uniform compression of the stowage adapter springs thereby causing a bending moment in the missile. This bending moment, plus the moment induced by shock, may act in combination to inordinately stress the missile at its mid-section.

The stowage adapters of the instant invention employ a springy resilient material as a contact with the missile. Thus, the vibrations caused by the vehicle and transmitted through the liquid springs may be satisfactorily damped. Further, this invention employs a time-hardening fluid to equally and accurately pressurize, on a permanent basis, the resilient material of each of the sets of stowage adapters for each particular missile. Thus, the disadvantages of the liquid springs between the launch tube and the vehicle and of the ring type stowage adapters are avoided by this invention.

Accordingly, it is an object of the present invention to provide stowage adapters capable of protecting a missile from significant bending moments.

Another object is to provide stowage adapters for missiles capable for exerting balanced forces at each adapter set.

A further object of the invention is the provision of stowage adapters which are capable of being fitted to the individual missile and launch tube combination.

Still another object is to provide a stowage adapter which is capable of being equally and accurately precompressed with respect to other adapters.

Yet another object of the present invention resides in the provision of a method of stowing missiles by permanently pre-compressing to an equal loading level a plurality of stowage adapters.

A still further object is the provision of a method of attenuating vibration and shock transferred to a missile while stored in a moving vehicle.

Other objects and many of the attendant advantages of this invention will be readily appreciated as the same becomes better understood by reference to the following detailed description when considered in connection with the accompanying drawings wherein:

FIG. 1 is an exaggerated schematic illustration of the manner in which tolerance-induced axial bow in a missile will under some circumstances produce prohibitive bending stresses in the missile; and FIG. 2 is a top view of a stowage adapter system about a missile according to the invention; and FIG. 3 is a sectional view of a stowage adapted of the invention taken along line 3—3 of FIG. 2.

Referring now to the drawings wherein like reference characters designate like or corresponding parts throughout the several views there is shown in FIG. 1 an exaggerated illustration of the manner in which tolerance-induced axial bow in a missile may produce prohibitive bending stresses. The missile 11 having an exaggerated tolerance-induced bow is shown in its stowage position in launch tube 10 and held in position by three sets of stowage adapters of the annular ring type. It may be readily seen that because of the tolerance-induced axial bow of the missile the stowage adapters are non-uniformly compressed. Thus, the stowage adapter units 12 through 17 will be non-uniformly compressed. That is, units 12, 15 and 16 will produce the largest spring forces causing therefore a bending moment in the missile. This bending moment, plus a moment induced by shock may act in combination to inordinately stress the missile at its mid-section.

As best seen in FIGS. 2 and 3 the stowage adapter employs a spring 20 having a missile contact surface 21 which has sufficient resilience to insulate shock and attenuate vibrations from adversely affecting the missile.

water 40. It can then be considered that the stabilizer itself has two portions, namely, a buoyant portion 42 and a weighted portion 44. However, if the stabilizer was placed in the water in a sideways position so that the water 40 would fill completely the space below the buoyant material 24, then the buoyant portion 42 would end at the lower end of the buoyant material 24, there being no trapped air 38. In either case the stabilizer is to be designed so that the weight of the weighted portion 44 and the relation of the weighted portion to the buoyant portion (or otherwise stated the positive metacentric height of the stabilizer itself) imparts a positive metacentric height to the total apparatus 10. Accordingly, if the missile has a specific gravity equal to or greater than one it will be necessary for the stabilizer to be designed to buoy up the over-all apparatus 10 and at the same time impart a positive metacentric height thereto. If the missile has a specific gravity less than one so that it would float in water by itself, then the stabilizer could have a lesser buoyant portion 42. Conceivably, if the missile had a sufficient buoyancy in and of itself, the stabilizer could be designed without the buoyant portion 42 so that the entire stabilizer would merely act as the weighted portion 44.

In the operation of the device the apparatus 10 is placed in the water and will assume an upright position as shown in FIG. 1, the nose end 16 of the missile being stabilized above the base end 18. At a proper time the missile is fired whereupon rocket exhaust gases exhaust through the rocket nozzle 30 fracturing the membrane retainer 28 at the thin portion 34, thereby breaking the threaded connection between the rocket nozzle and the annular flange 32. This separates the stabilizer 14 from the missile 12 and the missile commences its travel into space as shown in FIG. 3.

It is now apparent that the present invention provides a new device for stabilizing a missile for a water launch by attaching a stabilizer having a positive metacentric height at the base end of the missile, thus imparting a positive metacentric height to the over-all apparatus.

Obviously many modifications and variations of the present invention are possible in the light of the above teachings. For instance the buoyancy at the upper end of the stabilizer could be accomplished by a watertight door located some distance below the upper end 20 so as to provide an air space for the buoyant portion 42. Another alternative would be to provide no buoyant material or compartmenting at all in the stabilizer but instead rely upon trapped air within the stabilizer when it is placed in water in an upright position as is shown in FIG. 1. In the latter instance, water 40 would seek a particular level within the stabilizer and would trap air at the upper end thereof, the trapped air acting as the buoyant portion 42. It is therefore to be understood that within the scope of the appended claims, the invention may be practiced otherwise than as specifically described.

We claim:

1. An apparatus freely floating at the surface of a body of water comprising, an elongate missile having a nose end and a base end, an elongate tube having a closed top end and an open bottom end with the top end rigidly attached to the base end of the missile, said tube further having a dampening plate extending transverse the tube a sufficient distance from the entire periphery of the bottom end so as to resist movement of the apparatus within the water and aid vertical stability of the missile by substantially dampening dipping action of the apparatus in the water, said tube being filled with sufficient buoyant material from said top end so as to provide said apparatus with a positive metacentric height when the tube is entirely filled with water so that upon placing the apparatus in the water in any position the apparatus will float with the missile oriented in a substantially upright position, no part of said apparatus extending above said nose end of the missile, the weight of the apparatus being such that the tube is located in an entirely submerged condition within the water and means for separating the tube from the missile upon firing the missile whereby prior to firing the positive metacentric height, the dampening plate and the length of the tube vertically stabilizes the missile well in the water and upon firing the tube is separated so that rocket exhaust gases from the missile are impinged directly into the water.

2. A floatable apparatus comprising: an elongate rocket powered missile having a nose end, a base end and a specific gravity greater than one with respect to a body of water, an elongate tube having a watertight upper end and an open bottom end, said upper end being rigidly attached directly to the missile entirely below said base end with the missile and tube longitudinally aligned with respect to one another, a buoyant member mounted within a portion thereof above the tube's center of gravity of a sufficient buoyancy to float the entire apparatus in the water with the missile positioned substantially upright in the water and means for separating the tube from the missile upon firing said missile, whereby the effect of any wave motion of said body of water on the stability of the apparatus prior to launch is minimized and upon launch the exhaust from the missile is impinged directly into the water.

References Cited by the Examiner

UNITED STATES PATENTS

| 1,707,112 | 3/29 | Browne | 102—3 |
| 2,402,143 | 6/46 | Arenstein | 9—8 |
| 2,889,795 | 6/59 | Parks | 114—125 X |
| 3,077,143 | 2/63 | Draim et al. | 89—1.7 |

FOREIGN PATENTS 1,110,465   10/55   France.

OTHER REFERENCES

Aviation Week, vol. 73, No. 24, December 12, 1960, pp. 69, 73, 75, 79, Sea Launch Studied for Space Vehicles.

BENJAMIN A. BORCHELT, Primary Examiner.

SAMUEL BOYD, ARTHUR M. HORTON, Examiners.